US 10,843,719 B2

(12) United States Patent
Lelaure et al.

(10) Patent No.: US 10,843,719 B2
(45) Date of Patent: Nov. 24, 2020

(54) JUVENILE STROLLER

(71) Applicant: Dorel Juvenile Group, Inc., Foxboro, MA (US)

(72) Inventors: Xavier Lelaure, Mortagne sur Sevre (FR); Yann Naslain, Cholet (FR); Tse-Chien Wu, Kaohsiung (TW); Bo-Wen Yang, Chiayi (TW)

(73) Assignee: Dorel Juvenile Group, Inc., Foxboro, MA (US)

( * ) Notice: Subject to any disclaimer, the term of this patent is extended or adjusted under 35 U.S.C. 154(b) by 115 days.

(21) Appl. No.: 15/915,168

(22) Filed: Mar. 8, 2018

(65) Prior Publication Data

US 2018/0265114 A1    Sep. 20, 2018

(30) Foreign Application Priority Data

Mar. 14, 2017   (FR) .................................... 17 52071

(51) Int. Cl.
*B62B 7/08* (2006.01)
*B62B 7/06* (2006.01)
*B62B 7/10* (2006.01)

(52) U.S. Cl.
CPC .............. *B62B 7/062* (2013.01); *B62B 7/066* (2013.01); *B62B 7/08* (2013.01); *B62B 7/10* (2013.01); *B62B 2205/24* (2013.01)

(58) Field of Classification Search
CPC .......... B62B 7/006; B62B 7/0064; B62B 7/06
See application file for complete search history.

(56) References Cited

U.S. PATENT DOCUMENTS

| | | | |
|---|---|---|---|
| 7,497,461 B2 * | 3/2009 | Emerson ................. | B62B 7/083 280/42 |
| 8,888,123 B1 | 11/2014 | Cheng | |
| 2002/0084626 A1 | 7/2002 | Ageneau | |
| 2005/0258619 A1 | 11/2005 | Zweideck | |
| 2013/0181428 A1 * | 7/2013 | Bost ........................ | B62B 7/004 280/647 |
| 2013/0277949 A1 * | 10/2013 | Yin ....................... | B60N 2/1685 280/658 |
| 2014/0028003 A1 | 1/2014 | Saville | |

FOREIGN PATENT DOCUMENTS

| | | |
|---|---|---|
| EP | 1494911 B1 | 1/2005 |
| EP | 1946991 A1 | 7/2008 |
| EP | 2243683 A1 | 10/2010 |
| WO | 0989043 A1 | 3/2000 |
| WO | 2003086834 A1 | 10/2003 |
| WO | 2006029468 A1 | 3/2006 |
| WO | 2014154903 A1 | 10/2014 |

OTHER PUBLICATIONS

French Search Report for French App. No. 1752071 dated Nov. 9, 207, DF-141 FR, 8 pages.

* cited by examiner

*Primary Examiner* — John D Walters
*Assistant Examiner* — James J Triggs
(74) *Attorney, Agent, or Firm* — Barnes & Thornburg LLP (57) ABSTRACT

A stroller includes a chassis and a child support. The chassis is configured to roll along the ground in response to being pushed by a caregiver. The child support is coupled selectively to the chassis and is configured to support a child resting therein.

23 Claims, 10 Drawing Sheets

JUVENILE STROLLER

PRIORITY CLAIM

This application claims priority to French Application No. FR1752071, filed Mar. 14, 2017, which is expressly incorporated by reference herein.

BACKGROUND

The present disclosure relates to strollers for juveniles, and particularly to collapsible strollers for juveniles. More particularly, the present disclosure relates to collapsible strollers including removable child supports.

SUMMARY

According to the present disclosure, a stroller includes a chassis and a child support. The chassis is configured to roll along the ground in response to being pushed by a caregiver. The child support is coupled selectively to the chassis and is configured to support a child resting therein.

In illustrative embodiments,

Additional features of the present disclosure will become apparent to those skilled in the art upon consideration of illustrative embodiments exemplifying the best mode of carrying out the disclosure as presently perceived.

BRIEF DESCRIPTIONS OF THE DRAWINGS

The detailed description particularly refers to the accompanying figures in which:

FIG. 9A-9C are a series of plan views showing a handle included in the child's stroller showing that the handle includes a main button and a subsidiary button that are configured to actuate the cable for adjustment of a height of cable push-pieces and a cable for actuation of the unlocking mechanism;

DETAILED DESCRIPTION

Figure 1:
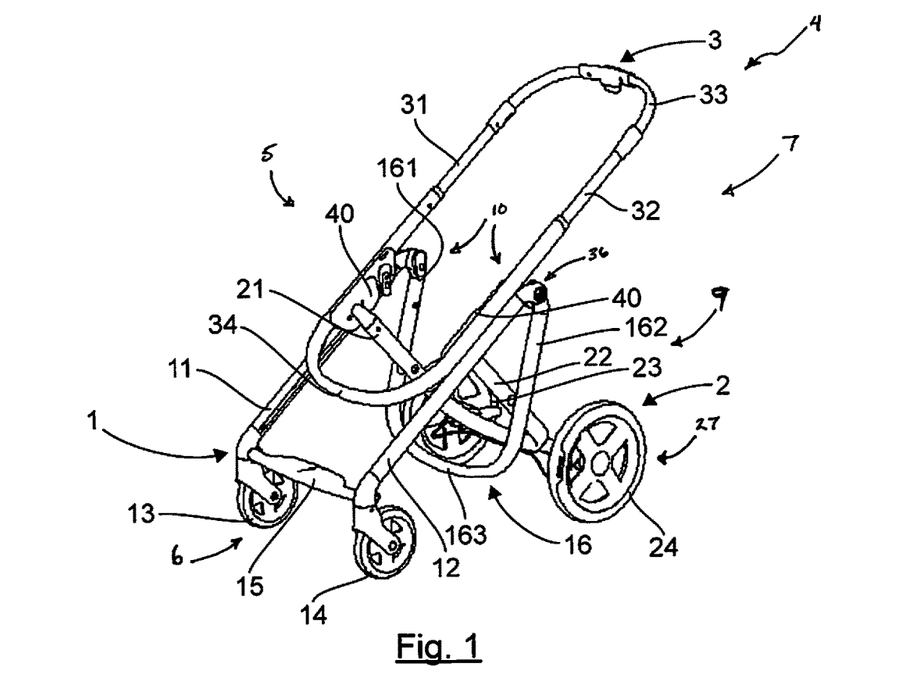
FIG. 1 is a perspective view of a a child's stroller according to a first embodiment of the present disclosure.

A folding stroller in accordance with the present disclosure is shown, for example, in FIG. 1. The folding stroller comprises a frame comprising three distinct sub-assemblies. In one example, the three distinct sub-assemblies are a front subassembly 1, a rear subassembly 2, and a handle subassembly 3.

A first front subassembly 1 comprises two front uprights 11, 12 supporting two front wheels 13, 14 and connected to each other by a cross-piece 15 located close to the wheels 13, 14, in this example forming a foot rest.

The front uprights could also support several wheels each, for example a pair of wheels. The two front uprights could also support a single wheel (or wheel module) only. In addition to the two rear wheels, the stroller would have three wheels.

A second rear subassembly 2 comprises two rear rods 21, 22 each carrying a rear wheel 23, 24 (or possibly several rear wheels). Each rod 21, 22 is articulated at two points, firstly relative to two uprights 161, 162 of a generally U-shaped frame element 16 composed of these two uprights 161, 162 articulated relative to the front uprights 11, 12 and connected to each other by a transverse portion 163 and secondly relative to a third handle subassembly 3. The rods 21, 22 can thus control displacement of the U-shaped frame element 16.

In this embodiment, the third handle subassembly 3 comprises a frame comprising a gripping bar 33 that moves and guides the stroller and is connected to two push-piece arms (or lateral uprights) 31, 32 and a lower cross-piece in the lower part. In the embodiment described, this third handle subassembly 3 comprises two U portions capable of sliding telescopically relative to each other, so as to adjust the handle to a height appropriate to the user.

Each push-piece 31, 32 is equipped with a trolley 40 forming a connecting part between the push-pieces 31, 32 and the front uprights 11, 12, for the push-pieces to slide along these front uprights. The trolleys 40 are fixed on the inside of the push-pieces, close to the lower cross-piece 34.

Figures 2A, 2B:
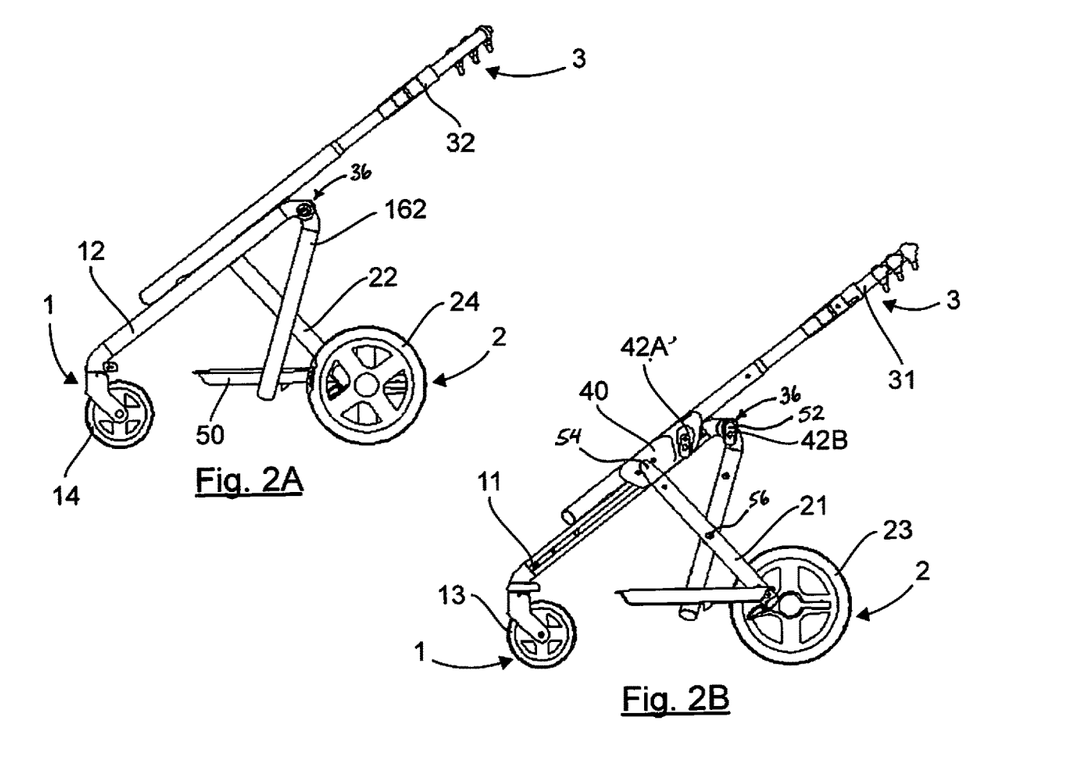
FIG. 2A is an elevation view if the child's stroller of FIG. 1.
FIG. 2B is a view similar to FIG. 2A showing the inside of the child's stroller of FIG. 2A.

The rods 21, 22 of the second rear subassembly 2 are freely articulated to their corresponding trolleys 40 as shown in FIGS. 1 and 2B. The translation movement of the trolleys (and the push-pieces) causes rotation of the rods 21, 22 during folding/unfolding operations, as described below with reference to FIGS. 3-6.

Each front upright 11, 12 comprises a slide 110, 120 oriented towards the inside of the stroller. Each slide 110, 120 has an opening oriented towards the opposite front upright) and is adapted to guide the corresponding trolley 40 in sliding. To achieve this, the trolley 40 comprises a traveller 41 complementary to the slide 110, 120.

Each slide 110, 120 is formed over the entire length of the front uprights 11, 12, or at least over a substantial portion of this length. In some examples, the slide may not be prolonged in the lower part, and the end of this slide could possibly be used as a stop for a booster seat as suggested in FIGS. 14A and 14B.

The stroller may also be fitted with various accessories, such as a support tray 50, without having any influence on folding/unfolding operations of the stroller. One or several child seats, or a carrycot or a shell may also be removably installed on the frame of the stroller. To achieve this, the two trolleys 40 comprise connection elements, for example of the MODULOCLIP® type 42 shown on FIGS. 11 and 12, designed to cooperate with complementary connection elements formed on a child support (not shown). One variant of a connection element 42 is shown on FIG. 2B, comprising two attachment travellers 42A, 42B capable of cooperating with a slide formed in a connector, for example of the MODULOCLIP® type The front attachment traveller 42A is fixed on the trolley 40 while the second rear traveller 42B is fixed slightly behind the attachment traveller 42A, in the upper part of the front uprights 11, 12. In particular, the first attachment traveller 42A can hold a child support, for example a single car seat, while the second attachment traveller 42B can be used to connect a child support, for example a main car seat while a booster seat can be fixed at the same time to the front of the stroller.

Figure 14A:
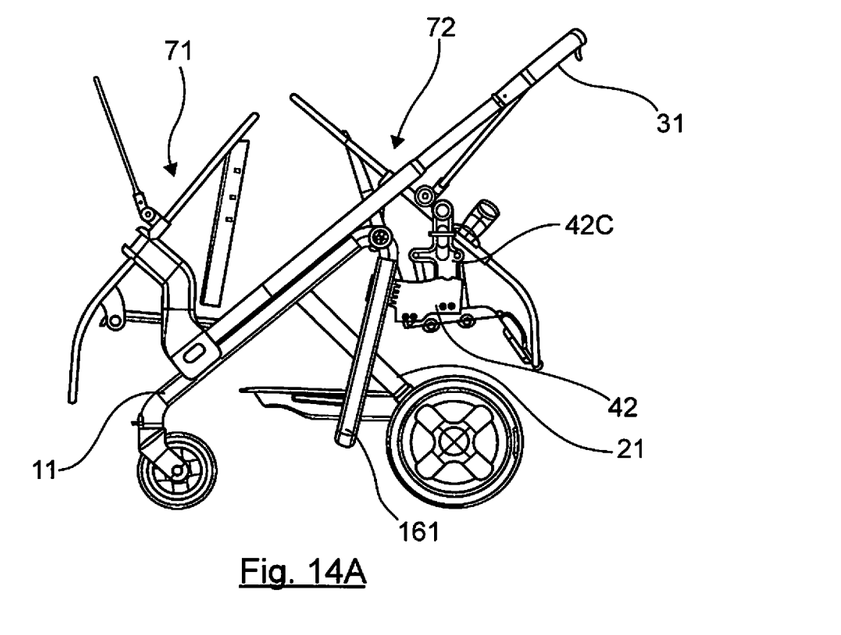
FIG. 14A is an elevational view of a stroller according to FIGS. 1-2B with a first and second child supports coupled to the stroller and showing that the first child support is arranged in a rear-facing orientation.
Figure 14B:
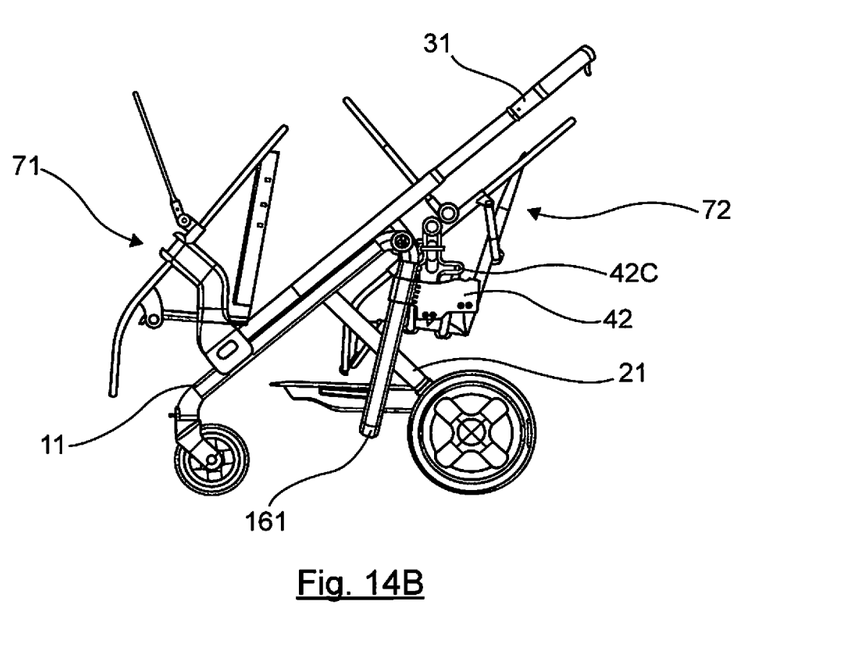
FIG. 14B is a view similar to FIG. 14A with the first child support re-arranged into a forward-facing orientation.

An example of such a booster seat 71 is shown in FIGS. 14A and 14B. For example it can be mounted supported on the cross-piece 34 of the third handle subassembly 3 and on the uprights 11, 12. FIGS. 14A and 14B illustrate another variant of the connection elements 42 comprising an attachment zone to the uprights 161, 162 (for example by screwing or clipping) and a connection zone 42C to install a child seat 72 offset towards the rear of the stroller.

Figures 13A, 13B:
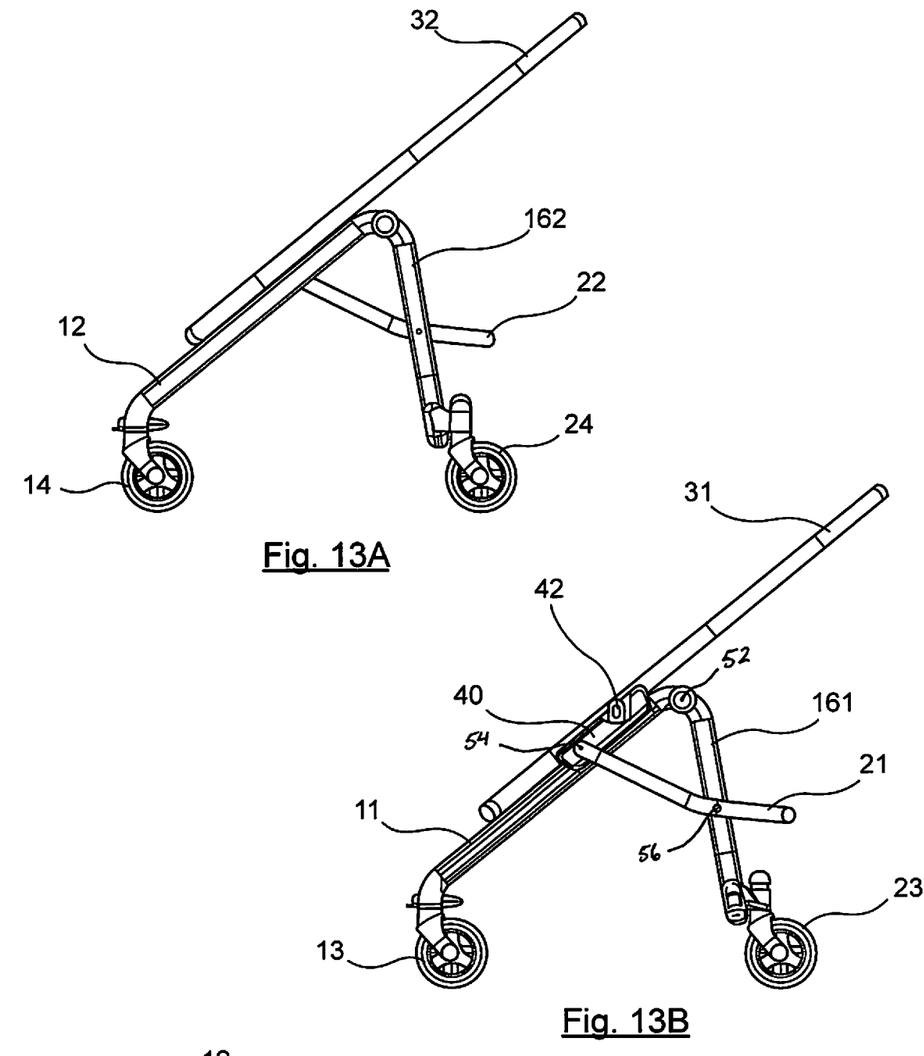
FIG. 13A is an elevational view of another embodiment of a stroller in accordance with the present disclosure showing the stroller in the unfolded position.
FIG. 13B is a view similar to FIG. 13A showing the inside of the child's stroller of FIG. 13A.
Figure 13C:
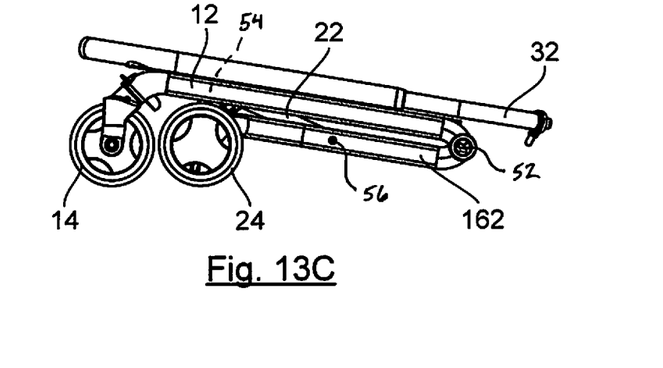
FIG. 13C is a view similar to FIGS. 13A and 13B showing the child's stroller in the folded position.

Another embodiment of a stroller in accordance with the present disclosure is shown, for example, in FIGS. 13A-14. The structure of this stroller is slightly different from that described above in that the rear wheels 23, 24 are carried by the uprights 161, 162 of the frame element 16 articulated relative to the front uprights 11, 12. The rods 21, 22 are articulated at two points, firstly relative to these uprights 161, 162, and secondly relative to the trolleys 40. On the other hand, their lower ends are free or are connected to each other through a cross-piece.

FIGS. 3A-6B show four different embodiments of the trolley/slide connection by which the trolleys 40 can slide in the corresponding slide 110, 120 in the front upright 11, 12. As shown in the sectional views in FIGS. 3A, 4A, and 5A, the trolley 40 is fixed to an inside of the corresponding push-piece 31.

Figure 3A:
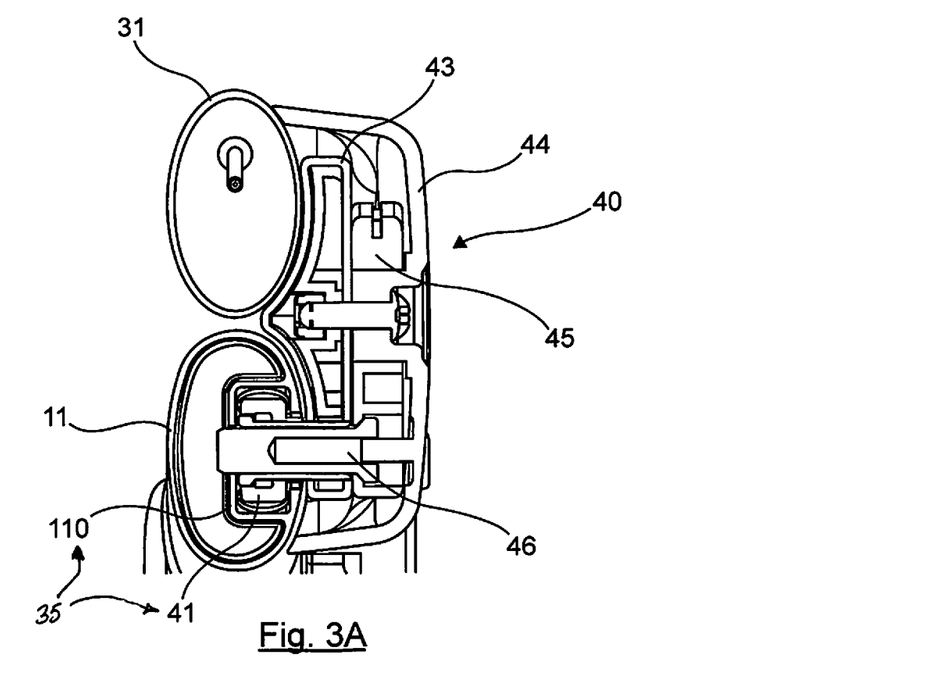
FIG. 3A is a sectional view of a connection between a sliding trolley and a slide included in the child's stroller of FIGS. 1-2B.
Figure 4A:
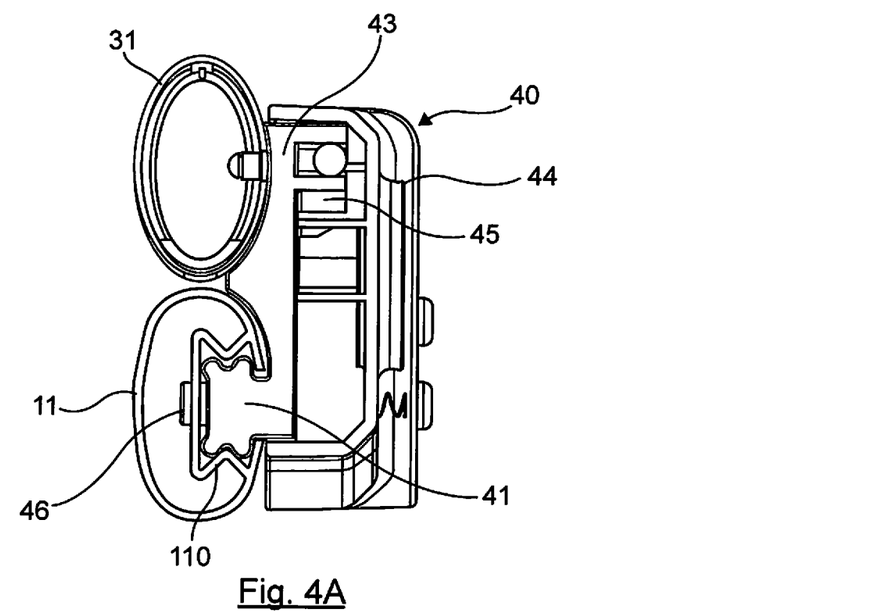
FIG. 4A is a sectional view of another embodiment of a connection used in a child's stroller showing the connection between a sliding trolley and a slide.
Figure 5A:
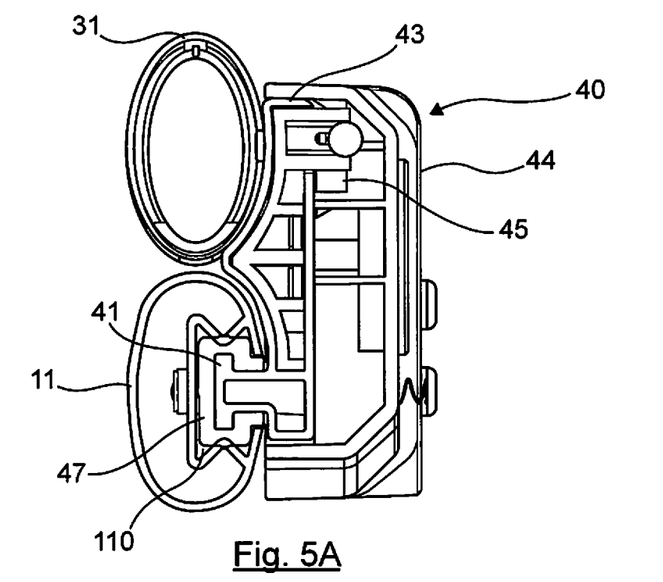
FIG. 5A is a sectional view of another embodiment of a connection used in a child's stroller showing the connection between a sliding trolley and a slide.

The internal shape of the trolley 40 is adapted to match the successive sections of the push-piece 31 and the front upright 11 so as to not leave any interstices into which a child could put his or her fingers, which could cause pinching.

To achieve this, the body of the trolley 40 comprises an elongated structural part 43 for which the section forms a side substantially flattened V-shape, made for example from aluminum, placed in contact with the push-piece 31 and the front upright 11. This support part 43 is installed fixed to the push-piece 31, by welding, or by any other appropriate attachment means (screwing, riveting, etc.). It fits inside a housing 44, which also contains the push-piece locking/unlocking mechanism, namely a cam 45 and a locking pin 46. The sliding traveller 41 is assembled to the part 43 (or is directly formed in this part).

In this embodiment, a locking pin 46 passes through it, the role of which is to block the push-pieces 31, 32 in one or several positions locked relative to the front uprights 11, 12. Operation of this pin 46 and the unlocking system is described in more detail below.

Figure 3B:
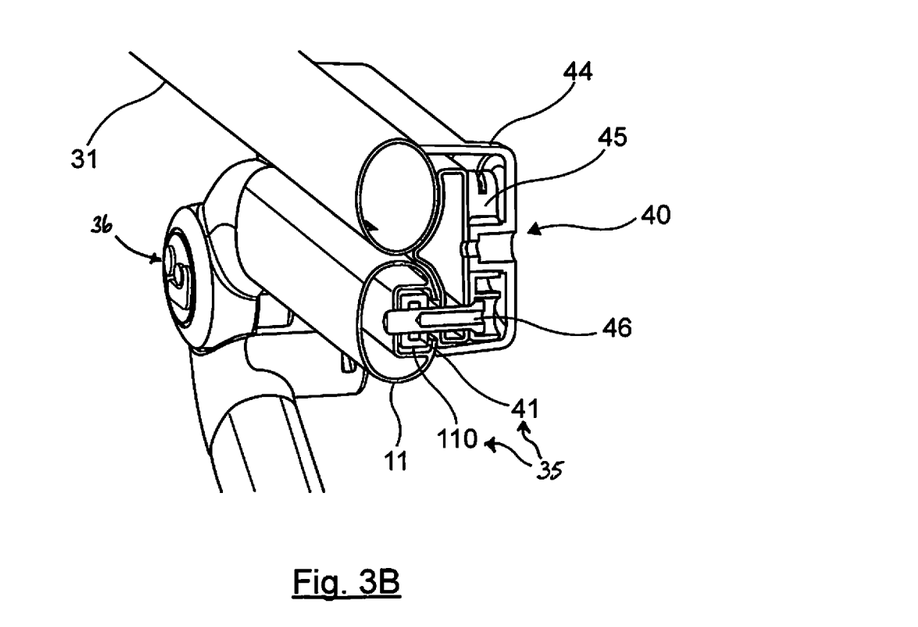
FIG. 3B is a partial perspective view of the connection of FIG. 3A showing how the connection between the sliding trolley and the slide makes use of a guide pad and a slide with substantially rectangular sections.

FIGS. 3A and 3B show a first embodiment in which the traveller 41 of the trolley 40 is a pad with a substantially rectangular profile and cooperates with a slide 110, 120 with an substantially rectangular section. The pad 41 in this case has an substantially rectangular section with slightly convex edges, specifically a slightly ovoid or ellipsoid shape.

In particular, this limits the friction area and/or provides for the presence of a clearance between the pad 41 and the slide 110, to minimize any risk of blockage of the push-pieces during folding/unfolding operations.

Figure 4B:
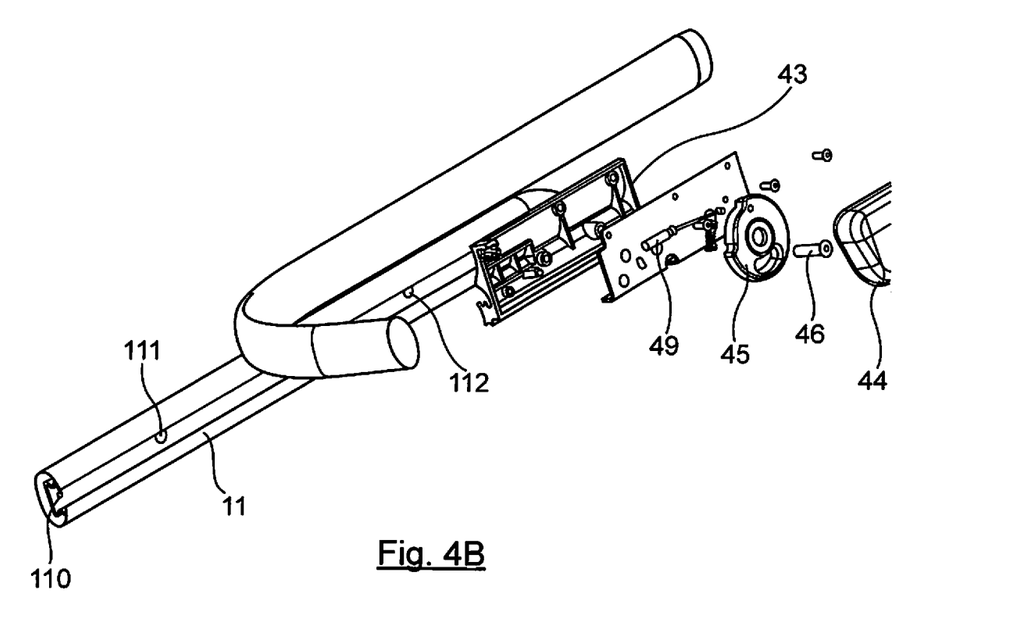
FIG. 4B is an exploded assembly view of the connection of FIG. 4A showing how the connection between the sliding trolley and the slide makes use of a guide pad and a slide with substantially cruciform sections.

FIGS. 4A and 4B show a second embodiment different from the first embodiment in that the traveller 41 of the trolley 40 is a pad with a substantially cruciform profile and that cooperates with a slide 110, 120 with a substantially cruciform section. The slide 110, 120 has a slide bottom surface and two side walls, the section of which forms a generally V shape in the upper part and in the lower part, the tip of the V facing towards the inside of the slide.

The cross-section of the pad 41 is approximately complementary to the side walls, however a clearance is formed between the two elements so that the system can function smoothly.

Figure 5B:
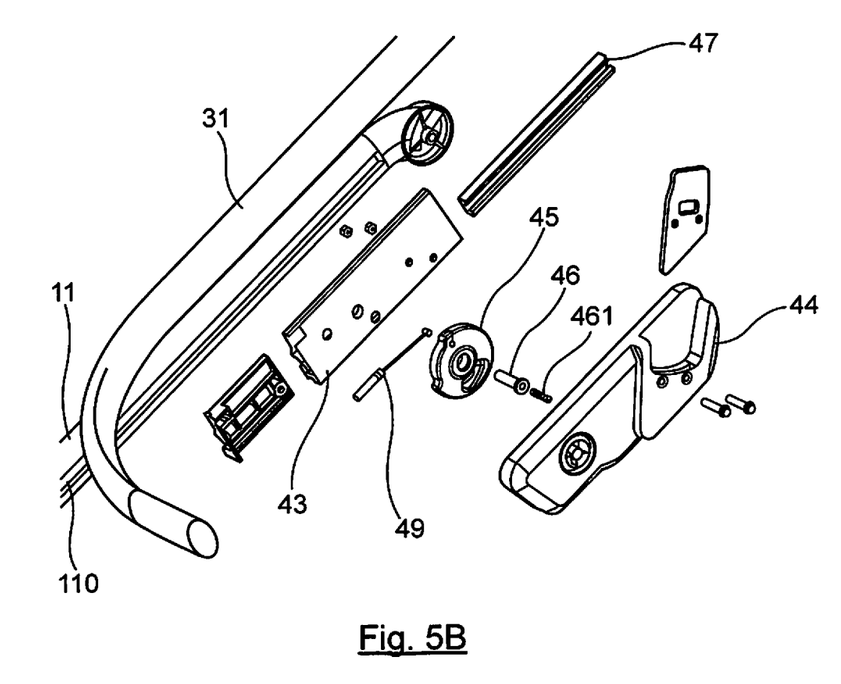
FIG. 5B is an exploded assembly view of the connection of FIG. 5A showing how the connection between the sliding trolley and the slide makes use of a guide pad and a substantially rectangular section and a slide with a substantially X-shaped section.

FIGS. 5A and 5B show a third embodiment in which the traveller 41 of the trolley 40 is a pad with an approximately rectangular profile that cooperates with a slide 110, 120 with a section substantially similar to that in the second embodiment. Thus, as in the previous embodiment, the slide 110, 120 has a slide bottom surface and two lateral walls, the section of each is approximately V-shaped with the tip of the V oriented towards the inside of the slide.

The traveller 41 is formed directly in the main part 43, and is covered by a coating 47, for example made of plastics materials with an approximately rectangular section, that deforms in contact with the tips of the V of the slide, improving sliding and/or reliability.

Figure 6A:
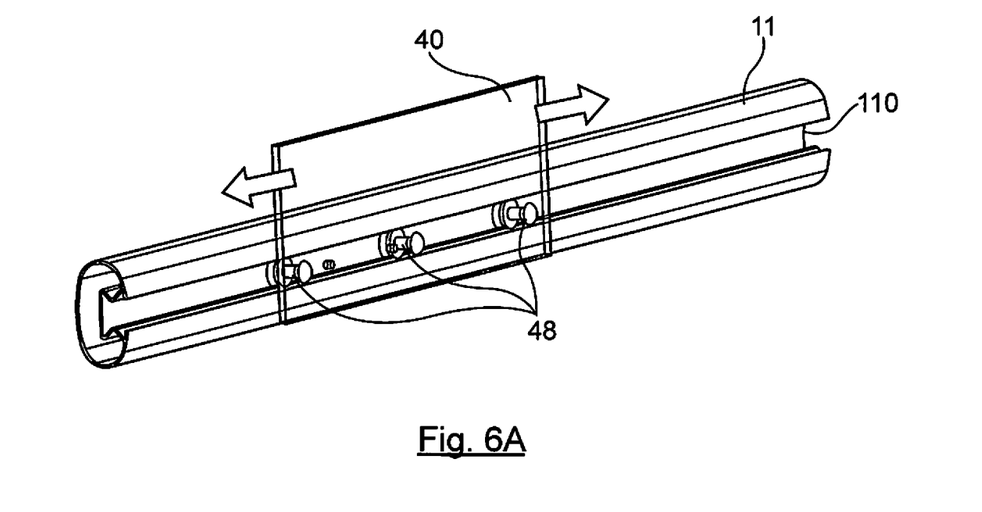
FIG. 6A is a partial perspective view showing a portion of a connection between a sliding trolley and a slide and a series of rollers are configured to roll in the slid.
Figure 6B:
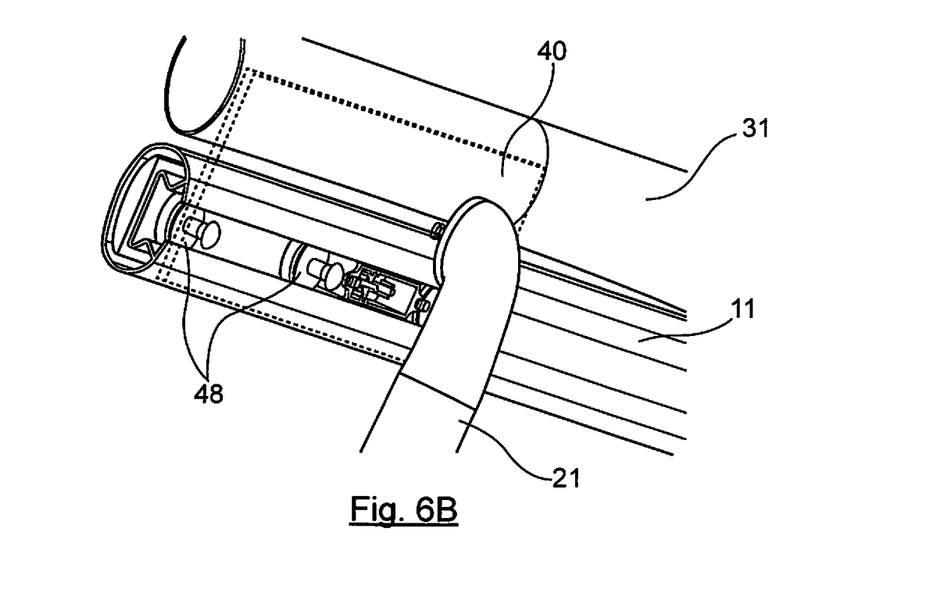
FIG. 6B is a partial perspective view of the connection of FIG. 6A showing how the connection between the sliding trolley and the slide makes use of rollers.

FIGS. 6A and 6B show a fourth embodiment a traveller of the trolley 40. The traveller of the trolley comprises a plurality (in this case three) rollers 48 adapted to roll in a slide 110, 120 with an approximately cruciform section.

Figure 7:
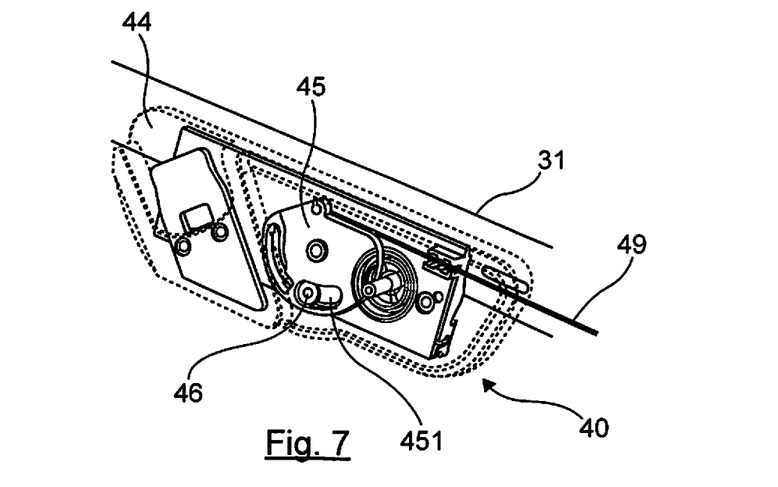
FIG. 7 is a partial perspective view of an unlocking mechanism included in a folding system of a child's stroller showing that the unlocking mechanism includes a cable connected to a cam and a locking pin.
Figure 8A:
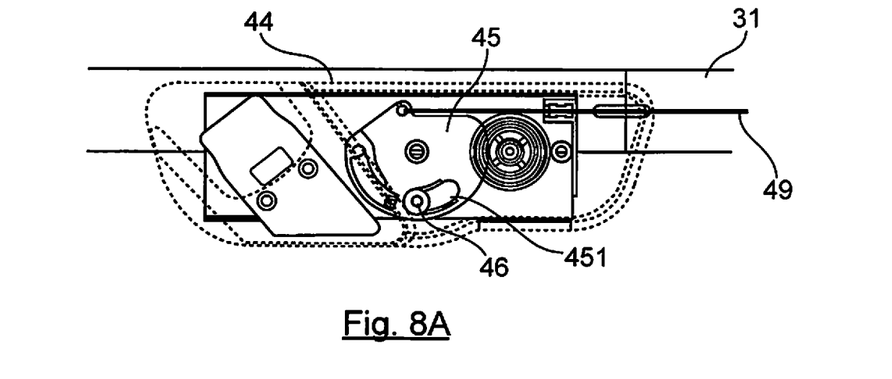
FIG. 8A is an elevational view of the locking mechanism of FIG. 7 in a locked position.
Figure 8B:
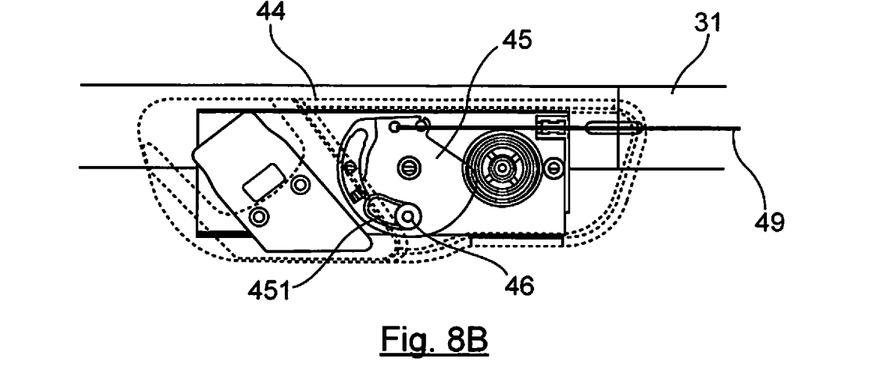
FIG. 8B is a view similar to FIG. 8A with the locking mechanism in an unlocked position.

FIGS. 7-8B show diagrammatically the inside of the housing 44 of the trolley 40 and the elements making up the locking/unlocking mechanism of the push-pieces 30, 31. This locking/unlocking mechanism is compatible with all embodiments of the connection between the pad and the slide described above.

The housing 44 comprises a cam 45 connected to a cable 49 actuated by a control system located on a stroller handle 33. The cam 45 operates in the classical manner and is free to move in rotation under the effect of the longitudinal displacement of the cable 49. It comprises a slot 451 with inclined edges, inside which the locking pin 46 is installed and passes through.

The rotation movement of the cam 45 is thus transformed into a translation movement of the pin 46, perpendicular to the rotation axis of the cam. As shown in FIG. 4B, the front uprights 11, 12, and more particularly the slides 110, 120, comprise two orifices or slots 111, 112 into which the locking pin 46 will fit, in two specific positions of the stroller.

The orifice 111 corresponds to the stroller being locked in a folded position, while the orifice 112 corresponds to the stroller being locked in an unfolded position.

When the pin 46 is offset under the effect of rotation of the cam 45, the pin is released from the orifice in which it was inserted. As a result, the pin moves from a locked position to an unlocked position so that the trolley is free to slide.

FIGS. 8A and 8B show the extreme positions of the locking pin 46 within the slot 451, in others the locked position (FIG. 8A) and the unlocked position (FIG. 8B). When the pin 46 is in an unlocked position, the user can make the push-pieces 30, 31 translate along the front uprights, the pin moving in friction with the slide 110 until the second locking orifice is reached.

A spring 461 located behind the pin 46 (visible on FIG. 5B), tends to bring the pin back into a rest position, in other words from an unlocked position to a locked position. The cable 49 and therefore unlocking of the push-pieces 30, 31 is actuated from the handle 33 of the stroller.

In this context, FIGS. 9A-10C illustrate the handle 33 of the stroller, that is provided with a first button 331 and a second button 332. The main button 331 can be actuated in two steps; a first step in which the user adjusts the height of the push-pieces 30, 31, and a second step in which the push-pieces are unlocked by pressing the second button 332 at the same time.

Figure 9A:
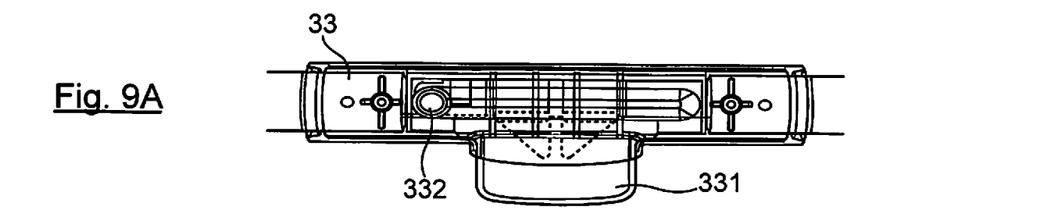
FIG. 9A is a plan view of the handle showing both buttons in a rest position as a result of neither button being pressed by a caregiver.
Figure 10A:
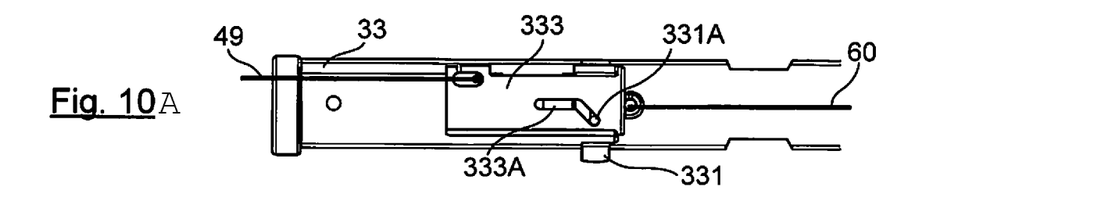
FIG. 10A is a partial elevational view of a portion of the child's stroller associated with the rest position of FIG. 10A showing interaction between the buttons of the handle and the locking mechanism at the rest position.

FIGS. 9A and 10A show the system at rest. The mechanism comprises an internal part 333, or traveller, capable of sliding inside the handle 33 when the two buttons 331, 332 are pressed. This traveller 333 comprises a slot 333A comprising a first portion parallel to the direction of sliding, and a second inclined portion forming an angle with the first portion equal to between about 130° and about 145°. In one example, the angle is about 135° in the disclosed embodiment.

The traveller 333 also comprises a connecting zone with a cable at each of its ends: a first cable 49 activates unlocking of the locking pin 46, and a second cable 60 activates the unlocking of a first part of the telescopic push-pieces with respect to a second part. The cable 49 is located inside an upper groove 333B, in which it can be displaced freely during the first step, and is only actuated during the second step.

Assuming that the length of the push-piece is variable (for example due to the telescopic effect), the cable 49 can, for example, by guided in the form of a loop such that the length of the cable remains the same regardless of the position of the push-piece.

Figure 9B:
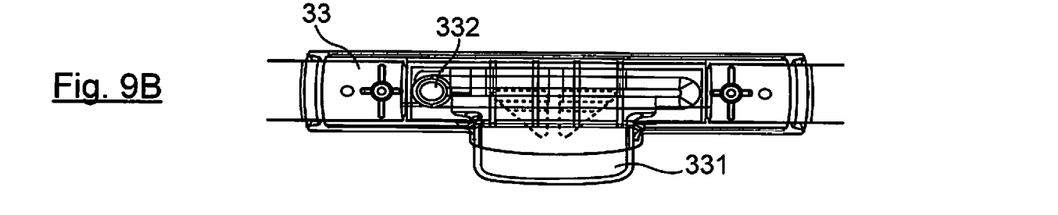
FIG. 9B is a view similar to FIG. 9A showing actuation of the main button to a first plateau for adjustment of the height of the push-pieces.
Figure 10B:
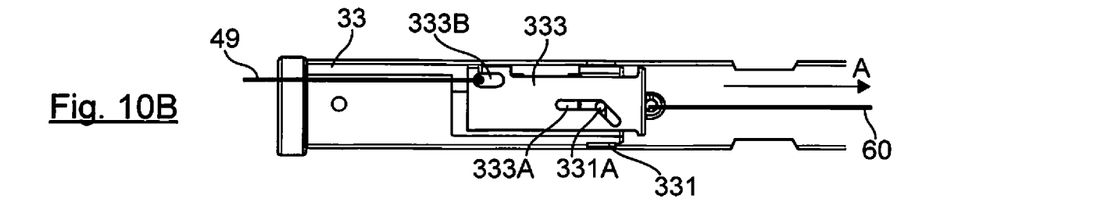
FIG. 10B is a view similar to FIG. 10A showing actuation of the cable for adjustment of the push-piece height according to FIG. 9B.

Finally, the main button 331 comprises a pin 331A, positioned at rest in the lower end of the inclined portion of the slot 333A. FIGS. 9B and 10B show the system when the main button 331 is activated during the first step, to a first level. Translation of the main button 331 causes displacement of the pin 331A inside the inclined portion of the slot 333A, until reaching the bending zone between the two portions of the slot as shown in FIG. 10B.

Figure 10C:
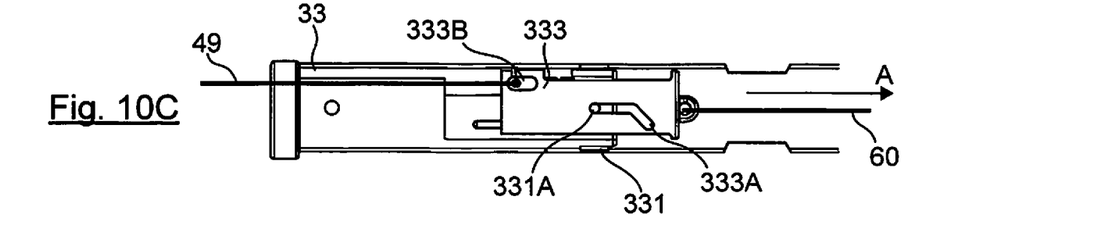
FIG. 10C is a view similar to FIG. 10B showing actuation of the cable to activate the unlocking mechanism according to FIG. 9C.

This displacement causes translation of the part 333 in a direction indicated by the arrow A that can be seen on FIGS. 10B and 10C. During this translation, the upper groove 333B moves around the unlocking cable 49 of the pin 46, which therefore remains immobile. On the other hand, translation of the part 333 causes actuation of the cable 60 that induces unlocking of a first part of the push-pieces relative to a second part of the push-pieces. The user can thus adjust the height of the push-pieces 30, 31 by making the first part slide telescopically relative to the second part.

Figure 9C:
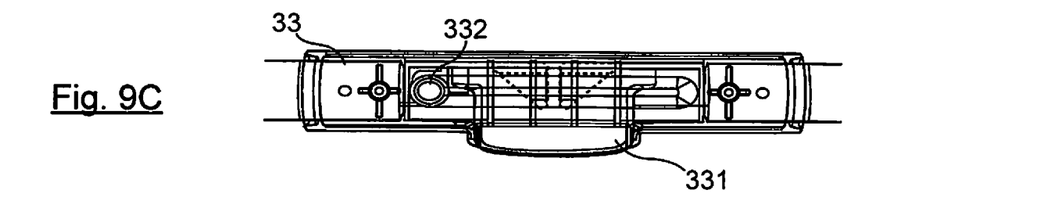
FIG. 9C is a view similar to FIG. 9B showing actuation of the subsidiary button at the same time as the main button to a second plateau to actuate the unlocking mechanism.

FIGS. 9C and 10C show the system when the main button 331 is pressed during the second step, to a second level, and the second button 332 is also pressed. The second level of the first button 331 cannot be reached unless the second button 332 is also pressed. This causes further translation of the part 333 along the direction shown by the arrow A, acting on the cable 49 that itself acts on the cam 45 as described above, such that the pin 46 moves from a locked position to an unlocked position so that the stroller can be folded/unfolded.

Figure 11:
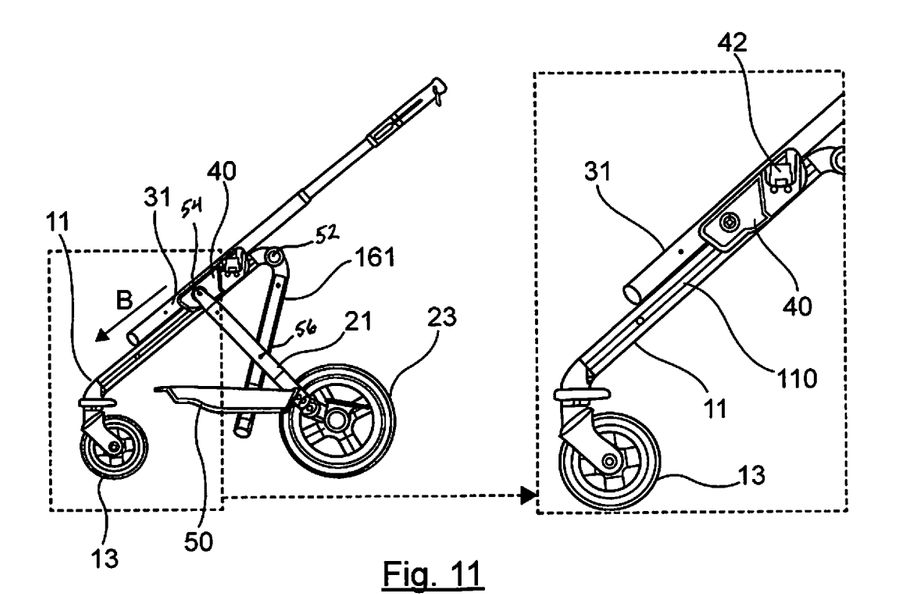
FIG. 11 is a diagrammatic view of the elements (front uprights, rear uprights, sliding trolley, push-pieces, etc.) of the stroller in the unfolded position.
Figure 12:
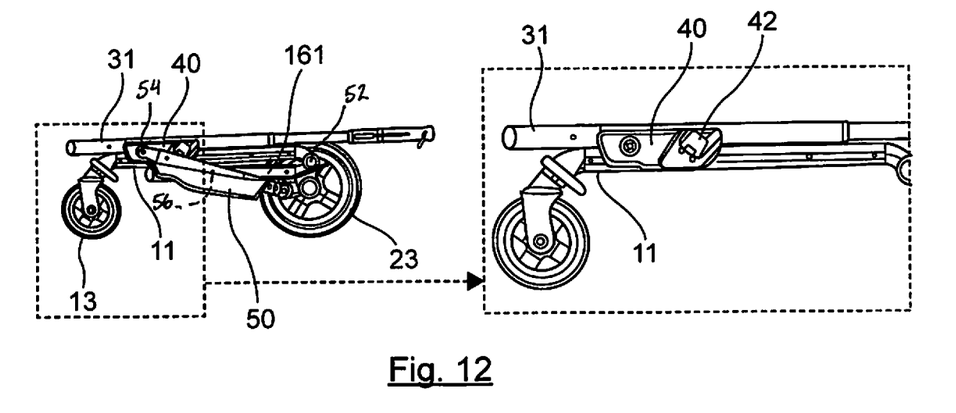
FIG. 12 is a view similar to FIG. 11 showing the elements in the folded position.

One example of a folding and unfolding operation is shown in FIGS. 11 and 12. FIG. 11 shows the stroller in the unfolded position. FIG. 12 shows the stroller in the folded position. When the stroller is in the folded position, this may be referred to as a flat folding position.

During folding, the rear wheels 23, 24 tend to move towards the push-pieces 31, 32 and to move away from the front wheels 13, 14 so as to form a compact approximately flat folded assembly as shown in FIG. 12. In one example of use, a user unlocks the slide on the push-piece arms 31, 32, by simultaneously pressing the first button 331 and the second button 332 located on the handle 33 of the stroller, so as to bring the locking pin 46 out of its housing 112. It makes the push-pieces 31, 32 slide along the slides 110, 120 on the front uprights 11, 12, through trolleys 40 along the direction of the arrow B illustrated on FIG. 11.

Each trolley 40 drives the rod 21, 22 attached to it in free rotation, the rear wheel 23, 24 carried by the rod then tending to move the push-pieces 31, 32 towards the rear of the stroller. Because the rods 21, 22 are also articulated relative to the uprights 161, 162 of the first front subassembly 1, they push these uprights so as to cause rotation tending to bring them towards the front uprights 11, 12 (in other words a rotation in the direction opposite to the direction of rotation of the rods).

The user continues to push the push-pieces 31, 32 until the locking pin 46 is inserted in the second housing under the effect of the spring 461. In this position, the trolleys 40 come approximately in contact with the end of the corresponding slides 110, 120. This position, shown in FIG. 12, corresponds to a folded position, the push-pieces 31, 32 then being approximately superposed on the front uprights 11, 12, namely placed above the front uprights, without direct contact with the latter.

Strollers in accordance with this present disclosure may also use another folding method, for example folding called upright folding. This variant is shown in FIGS. 13A-13C. In this case the position of the rear wheels is different from that in the first embodiment, therefore the result of folding is different. The rear wheels 23, 24 tend to move towards the front wheels 13, 14 and away from the handle 32.

In the same way as in the embodiment described above, the user unlocks sliding of the push-piece arms and then makes them slide along the slides 110, 120 of the front uprights, through the trolleys 40. Displacement of the trolleys 40 then acts on the rods 21, 22. The kinematics of folding (and therefore the movement of the different elements, namely the push-pieces 31, 32, the rods 21, 22, and the uprights 161, 162, etc.) is substantially the same as with the first embodiment.

However, considering that the rear wheels 23, 24 are carried by the rear uprights 161, 162 and no longer by the rods 21, 22 (as was the case in the first embodiment), the rear wheels 23, 24 tend to move towards the front wheels 13, 14, the free end of the rods 21, 22 then moving away from the front wheels and tending to move the push-pieces towards the rear of the stroller along a direction of rotation opposite to the direction of rotation of the rear wheels 23, 24 carried by the uprights 161, 162.

A folding stroller in accordance with the present disclosure is movable between an unfolded position and a folded position. The folding stroller moves from the unfolded position to the folded position through a combination of sliding and folding of the foldable stroller.

The folding stroller includes a frame that comprises two uprights each carrying at least one front wheel or front wheel module (for example two matching wheels) and two push-piece arms or push-pieces, possibly connected by their upper ends so as to form a handlebar.

Each side of the frame thus forms an assembly composed of two connected elements free to move in translation relative to each other, a push-piece arm or push-piece, and a front arm.

In one embodiment, each push-piece extends at least partially above the front upright, in other words it is at least partially superposed with the corresponding front upright. According to variants, each push-piece arm may be assembled so as to move under the front upright. It may also be slightly offset from the vertical plane passing through the front upright.

In any case, the push-piece arm and the front upright are assembled one above the other (offset in height), or superimposed, and are substantially parallel to each other. They are slightly apart from each other so that a space of few millimeters is between them. In one example, the space is about 1 mm to about 6 mm. In another example, the space is about 1 mm to about 3 mm.

Depending on the case, the push-piece arm can be above or below the front upright. In the illustrated embodiments, the push-piece arm and the front upright are in a same vertical plane. They could, however, be slightly offset one from the other, with respect to this vertical plane. Each push-piece is thus free to move parallel to one of the front uprights such that the push-pieces slide along the front uprights during the stroller folding/unfolding operation.

According to the present disclosure, this displacement is made possible due to the use of a pair of trolleys each fixed to one of the push-pieces, and moving relative to the corresponding front uprights. The trolley forms the main connecting part between the push-piece arm and the front upright. Notably, according to the disclosed embodiment, it is the only connecting part between them.

The front uprights are each fitted with a slide, or groove or rail, formed along their length, inside which a traveller can move (possibly composed of several elements) supported by each of the trolleys. This system is such that the push-pieces are guided through the trolley and its traveller along the front uprights between an unfolded position and a folded position. The length, shape, guidance, and the material from which the traveller is formed can be chosen to minimize overhang problems.

Furthermore, slides are formed on the inside faces of the uprights, namely a slide formed on a first front upright has an opening facing approximately towards the inside of the stroller, towards (or approximately towards) the opening of the slide formed on the second front upright. In this way, the slides are not visible or are only slightly visible from outside the stroller. As a result, efficiency and robustness of this folding mechanism is combined with pleasing aesthetics of the stroller.

In another illustrative example, the trolleys may be fixed to each of the front uprights and move in the slides (or grooves or rails) formed in each of the push-piece arms. When folding, the slides are guided in sliding by the trolleys such that the push-piece arms can slide relative to the front uprights.

The slides are then formed on the inner faces of the push-piece arms, with their opening facing approximately towards the inside of the stroller, in other words towards (or approximately towards) the opening of the slide on the second push-piece.

A folding child carriage comprises, on each of its sides, an assembly composed of two elements free to move in translation relative to each other. The elements being a front upright and a push-piece arm.

A first of the elements of each assembly comprises a slide formed in the length of the first element with an opening approximately facing the assembly on the other side of said frame and a second of the elements is fixed to a trolley on which a traveller is fixed free to slide in the slide. The elements are maintained substantially one above the other with a predetermined space between them.

The trolley forms a connecting part, the only connecting part according to some embodiments, between the first element and the second element of each assembly, the connection forming a rail (female part)/traveller (male part), or slide/traveller assembly. The slides are oriented approximately facing each other, in other words towards the inside of the stroller and are not visible or are only slightly visible, particularly when a hammock or other child support is fitted on the frame.

Seen from the exterior, the front uprights and the push-piece arms can be smooth, for example round or oval, without any visible protuberance or functional elements and extend over a long length. The aesthetic appearance of the stroller and its frame are thus improved, since the designer has greater freedom.

The front uprights and the push-piece arms are put one above the other (according to the embodiments, the push-piece arm can be above or below), without direct contact between them, a space being defined between them. They are thus superimposed, or substantially superimposed, a slight offset of the push-piece arm with respect to a vertical plane passing through the front upright being possible. The trolley ensures this possible offset, and the height offset between the two elements.

The trolley and the corresponding traveller may extend over a relatively long length, for example between about 8 cm and about 15 cm, which is sufficient to provide smooth operation and reliability and to overcome potential overhang problems.

The predetermined space can provide a gap between said elements comprised between 1 and 6 millimeters between said elements, preferably between 1 and 3 millimeters, sufficiently short to notably avoid risks of pinching.

The uprights may carry a wheel or a wheel module at their lower ends, to form a four wheel type stroller. According to a three wheel variant, the uprights may be joined together at their lower parts or be fitted with a cross-piece to carry a single wheel or wheel module, in the central position.

In one example, the first of these elements is a front upright and the second is a push-piece arm. Thus, the trolleys fixed to the push-piece arms may slide along slides formed in the front uprights. In another embodiment, the first element is a push-piece arm and the second element is a front upright.

In one example, the traveller may be in the form of a single element. In another example, the traveller may be in the form of several elements. Thus, according to one particular embodiment, the traveller may include at least one guide pad.

The guide pad is adapted to move efficiently in the slide formed in the corresponding front upright. Its shape and/or its material can be chosen to slide well, limiting friction, and/or allowing functional clearance.

In another example, the traveller can comprise at least one roller free to move in rotation. The roller(s) roll(s) in the slide so that the trolley can move efficiently.

In another illustrative example, the child carriage may include means of locking at least one of the trolleys in at least one position relative to the front uprights. This locking can be applied in one or several positions, for example an unfolded position and a folded position.

In another illustrative example, the locking means comprise at least one locking pin capable of cooperating with at least one lock housing provided for this purpose in the corresponding slide.

In another illustrative example, the slide comprises at least two lock housings, corresponding to a folded position and an unfolded position of the carriage.

In another illustrative example, the pin is free to move perpendicular to the axis of the front upright to change from a locked position to an unlocked position under the action of an unlocking cable.

In another illustrative example, the push-piece arms form the lateral uprights of a frame also comprising an upper crosspiece forming a handlebar, and a lower cross piece. This configuration enables placement of a booster seat making use of the lower cross-piece.

In another illustrative example, the carriage includes two rear uprights, a lower end of which is connected to at least one rear wheel or a rear wheel module, and an upper end of which is installed free to pivot on said trolley. The rear uprights pivot as a result of the displacement of the push-pieces at the time of the folding/unfolding operations.

In another illustrative example, each of the trolleys carries a first attachment element capable of cooperating with a second complementary element carried by a child support. This attachment element may be a male or female connector, or can be designed to hold such a connector.

In another illustrative example, each of the push-pieces is composed of two telescopic portions. The height of the push-pieces can thus be adjusted by sliding a first telescopic portion relative to a second portion.

A stroller in accordance with the present disclosure addresses several competing interests. One interest is the efficiency of folding to make the dimensions of the folded stroller as small as possible to facilitate storage and transport, for example in an automotive vehicle. Another interest is the simplicity of folding and unfolding the stroller, for example, folding with one hand. Another interest is the robustness of the stroller so as to maximize safety of transporting the child. Another interest minimizing manufacturing costs. Another interest is providing an aesthetic appearance by putting the functional elements that guide sliding of the push-piece arms on the inside of the stroller so that they are not visible or are only slightly visible so as to provide a smooth and fluid design.

A folding carriage for a child comprises, on each of its sides, an assembly composed of two elements free to move in translation relative to each other. The elements are a front upright 11, 12 and a push-piece arm 31, 32. A first of the elements of each assembly comprises a slide 110, 120 formed in the length of said first element and having an opening approximately facing the assembly on the other side of the frame. A second of the elements is fixed to a trolley 40 carrying a traveller 41 which is free to move in the slide 110, 120.

In illustrative embodiments, a stroller 4 includes a mobile base 5 and a child carrier 71, 72 as shown in FIGS. 1 and 14A. The mobile base 5 is adapted to be pushed by a caregiver at a rear portion of the mobile base 5 and configured to change from an unfolded mode to a folded mode. The child carrier 71, 72 is coupled to the mobile base 5 forward of the rear portion of the mobile base 5.

In illustrative embodiments, the mobile base 5 includes a rolling cart 6 and a foldable frame 7 coupled to the rolling cart 6 to move relative to the rolling cart 6 from the unfolded mode to the folded mode. The foldable frame 7 includes a cart pusher 3, a cart stabilizer 9, and a fold-control system 10 configured to cause the cart pusher 3 to translate relative to the rolling cart 6 and the cart stabilizer 9 to move toward the rolling cart 6 in response to the caregiver engaging the fold-control system 10 so that the folded mode is established.

In illustrative embodiments, the cart stabilizer 9 includes a rear-wheel unit 27 coupled to the rolling cart 6 to move relative to the rolling cart 6 and a support bar 16 coupled to the rolling cart 6 to pivot about a first pivot axis 52. The rear-wheel unit 27 is coupled to the fold-control system 10 and the cart pusher 3 to pivot about a second pivot axis 54 and the second pivot axis 54 translates with the cart pusher 3 as the foldable frame 7 changes from the unfolded position to the unfolded position. The support bar 16 is coupled to the rear-wheel unit 27 to pivot relative to rear-wheel unit 27 about a third pivot axis 56. The third pivot axis 56 moves about the first pivot axis 52 toward the rolling cart 6 when the foldable frame 7 changes to the folded mode.

In illustrative embodiments, the fold-control system 10 includes a fold unit 40 coupled to the cart pusher 3 to move therewith and translate relative to the rolling cart 6 and a fold-unit actuator 36 coupled to the cart pusher 3 and coupled to the fold unit 40. The fold-unit actuator 36 is configured to change the fold unit 40 from a locked mode in which the fold unit 40 blocks movement of the cart pusher 3 relative to the rolling cart 6 and an unlocked mode in which the fold unit 40 permits movement of the cart pusher 3 relative to the rolling cart 6.

In illustrative embodiments, the fold unit 40 includes a slide 35, a cam 45, and a pin 46. The slide 35 extends between and interconnects the cart pusher 3 to the rolling cart 6 to cause the cart pusher 3 to slide relative the rolling cart 6. The cam 45 is coupled to the slide 35 to move therewith and pivot about a fourth pivot axis as the fold unit 40 moves between the locked and unlocked modes. The pin 46 is coupled to the cam 45 to move laterally between a an engaged position in which the pin 46 extends into and mates with the rolling cart 6 when the fold unit 40 is in the locked mode and a disengaged position in which the pin 46 is spaced apart from the rolling cart 6 when the fold unit 40 is in the locked mode. The pin 46 moves laterally inward as the cam 45 rotates.

In illustrative embodiments, the slide 35 includes a traveler 41 and a traveler receiver 110. The traveler 41 is coupled to the cart pusher 3 to move therewith. The traveler receiver 110 is coupled to the rolling cart 6 in a fixed position relative to the rolling cart 6 and located in a space formed in the rolling cart 6. The traveler 41 is arranged to extend into and engage the traveler receiver 110 to slide relative to the rolling cart 6.

The invention claimed is:

1. A folding carriage for a child, the folding carriage comprising
    a frame including, on each of its sides, an assembly composed of two elements free to move in translation relative to each other, the elements being a front upright and a push-piece arm,
    wherein a first of the elements in each assembly comprises a slide formed in a length of said first element and having an opening approximately facing the assembly located on the other side of the frame,
    wherein a second of the elements is fixed to a trolley carrying a traveller free to move in the slide, the elements being maintained substantially one above the other with a predetermined space between them,
    wherein the folding carriage further comprises lock means for locking at least one of the trolleys in at least one position relative to the front uprights, and
    wherein the lock means comprises at least one locking pin capable of cooperating with at least one lock housing provided for this purpose in the corresponding slide.

2. The folding carriage of claim 1, wherein the first of the elements is a front upright and the second of the elements is a push-piece arm.

3. The folding carriage of claim 1, wherein the first of the elements is a push-piece arm and the second of the elements is a front upright.

4. The folding carriage of claim 1, wherein the predetermined space provides a gap between the elements of between about 1 millimeter to about 6 millimeter.

5. The folding carriage of claim 4, characterized in that said predetermined space provides a gap between said elements comprised between 1 and 3 millimeters.

6. The folding carriage of claim 1, wherein the traveler includes at least one guide pad.

7. The folding carriage of claim 1, wherein the traveler includes at least one roller free to move in rotation.

8. A folding carriage for a child, the folding carriage comprising
    a frame including, on each of its sides, an assembly composed of two elements free to move in translation relative to each other, the elements being a front upright and a push-piece arm,
    wherein a first of the elements in each assembly comprises a slide formed in a length of said first element and having an opening approximately facing the assembly located on the other side of the frame,
    wherein a second of the elements is fixed to a trolley carrying a traveller free to move in the slide, the elements being maintained substantially one above the other with a predetermined space between them,
    wherein the folding carriage further comprises lock means for locking at least one of the trolleys in at least one position relative to the front uprights,
    wherein the lock means comprises at least one locking pin capable of cooperating with at least one lock housing provided for this purpose in the corresponding slide, and
    wherein the slide comprises at least two lock housings, respectively corresponding to a folded position and an unfolded position of the carriage.

9. A folding carriage for a child, the folding carriage comprising
    a frame including, on each of its sides, an assembly composed of two elements free to move in translation relative to each other, the elements being a front upright and a push-piece arm,
    wherein a first of the elements in each assembly comprises a slide formed in a length of said first element and having an opening approximately facing the assembly located on the other side of the frame,
    wherein a second of the elements is fixed to a trolley carrying a traveller free to move in the slide, the elements being maintained substantially one above the other with a predetermined space between them,
    wherein the folding carriage further comprises lock means for locking at least one of the trolleys in at least one position relative to the front uprights, and
    wherein the lock means comprises at least one locking pin capable of cooperating with at least one lock housing provided for this purpose in the corresponding slide, and
    wherein the pin is free to move perpendicular to the axis of the front upright, to change from a locked position to an unlocked position, under the action of an unlocking cable.

10. The folding carriage of claim 1, wherein the push-piece arms form lateral uprights of a frame also comprising an upper crosspiece forming a handlebar and a lower cross piece.

11. The folding carriage of claim 1, further comprising two rear uprights, a lower end of which is connected to at least one rear wheel or a rear wheel module, and an upper end of which is installed free to pivot on the trolley.

12. The folding carriage of claim 1, wherein each of the trolleys carries a first attachment element capable of cooperating with a second complementary element carried by a child support.

13. The folding carriage of claim 1, wherein each of the push-pieces is composed of two telescopic portions.

14. The folding carriage of claim 8, wherein the first of the elements is a front upright and the second of the elements is a push-piece arm.

15. The folding carriage of claim 8, wherein the first of the elements is a push-piece arm and the second of the elements is a front upright.

16. The folding carriage of claim 8, wherein the predetermined space provides a gap between the elements of between about 1 millimeter to about 6 millimeter.

17. The folding carriage of claim 9, wherein the push-piece arms form lateral uprights of a frame also comprising an upper crosspiece forming a handlebar and a lower cross piece.

18. The folding carriage of claim 9, further comprising two rear uprights, a lower end of which is connected to at least one rear wheel or a rear wheel module, and an upper end of which is installed free to pivot on the trolley.

19. The folding carriage of claim 9, wherein each of the trolleys carries a first attachment element capable of cooperating with a second complementary element carried by a child support.

20. The folding carriage of claim 9, wherein each of the push-pieces is composed of two telescopic portions.

21. The folding carriage of claim 9, wherein the predetermined space provides a gap between the elements of between about 1 millimeter to about 6 millimeter.

22. The folding carriage of claim 9, wherein the traveler includes at least one guide pad.

23. The folding carriage of claim 11, wherein the traveler includes at least one roller free to move in rotation.

* * * * *